United States Patent [19]

Morris

[11] 4,442,002

[45] Apr. 10, 1984

[54] FILTRATION DEVICES

[75] Inventor: Peter A. Morris, Southampton, England

[73] Assignee: Cresta Technology Limited, Chichester, England

[21] Appl. No.: 402,676

[22] Filed: Jul. 28, 1982

[30] Foreign Application Priority Data

Aug. 5, 1981 [GB] United Kingdom ............... 8123933

[51] Int. Cl.³ ...................... B01D 33/06; B01D 35/12; B01D 35/22
[52] U.S. Cl. .................................. 210/411; 210/423; 210/427
[58] Field of Search ............... 210/348, 359, 403, 404, 210/405, 411, 412, 425, 427, 798, 407, 409, 420, 422, 423

[56] References Cited

U.S. PATENT DOCUMENTS 3,017,029  1/1962  Berninger ........................... 210/411
4,169,792 10/1979  Dovel ................................. 210/411

Primary Examiner—Frank Sever
Attorney, Agent, or Firm—Pollock, Vande Sande & Priddy

[57] ABSTRACT

A rotary filter for polymers comprises an inward flow filter drum mounted in a housing and consisting of inner and outer filter barrels 7 and 6 which retain between them a cylindrical filter element 8 of wire gauze or porous sintered metal. The outer barrel has regularly spaced large openings in its outer surface which communicate through the thickness of the barrel wall and via divergent passageways with even larger openings on the inner surface of the barrel. In contrast, the inner barrel has a plurality of much smaller through openings in registry with each of the large openings. The drum is rotated by a hydraulic ram via a pawl and pinion drive to bring successive openings in the outer barrel into communication with passages 22, 23, through which accumulated solids are flashed from the corresponding areas of the filter element by the resulting reverse flow of filtrate. The filter minimizes downstream pressure fluctuations and may be used upstream of an extruder.

12 Claims, 8 Drawing Figures

FILTRATION DEVICES

This invention concerns improvements relating to filtration devices and particularly, though not exclusively, concerns such devices intended for the removal of foreign particulate material from a stream of fluid material such as plastic material being processed through an extrusion apparatus.

The problem arises with such devices that, after more or less prolonged use depending upon the degree of contamination of the material being filtered, the filter becomes blocked with particulate material and needs to be changed. Particularly in the case of filtering devices for use with plastic extrusion machines, the need to change the filter gives rise to problems on account of the interruption caused to the extrusion process, leading to loss of production. In order to overcome this problem, so called screen changers such as that described in British Pat. No. 1 287 076 have been devised which enable a replacement filter unit to be introduced into the stream of material being filtered without substantial interruption of the filtration process.

The device described in British Pat. No. 1 287 076 is of the kind wherein a rectilinear slideway extends transversely of the flow passage and replacement filter blocks designed to be accommodated closely within the slideway are arranged to be driven into operative position within the flow passage by means of a hydraulic piston and cylinder unit. While this type of device has been employed in many applications with considerable technical and commercial success, it is difficult fully to automate the device on account of the necessity of feeding clean replacement filter blocks to the hydraulic ram.

In order to obtain a device which could be fully automated, a screening device has been proposed which comprises a generally cylindrical, axially rotatable filter drum arranged to receive material to be filtered at its outer surface and to deliver filtered material from its interior, the material having been filtered by passage through the wall of the drum from the exterior to the interior thereof, and means for cleansing the external surface of the filter drum by selective back flow of filtered material from the interior to the exterior of the drum so as to flush away deposited foreign matter. The cleansing means comprises a manifold member in seating engagement with a limited area of the external surface of the drum to provide for a flow of filtered material from the drum interior through said limited area of the drum external surface and into the said manifold member. By rotating the filter drum so as to cause different areas of the external surface thereof to register successively with the manifold member, the entire external surface of the filter drum can be flushed clean of entrained material by back flow of clean filtered material.

One such back-flushing type of device is described in applicant's British Pat. No. 1 602 585 and another such device is described in German Patent Application No. 2 407 663 with reference to FIGS. 1 and 2 of the drawings thereof. In the device described in British Pat. No. 1 602 585, the filter drum through-apertures are small and are arranged into a series of broad axial bands which each comprise a large number of apertures and are spaced apart circumferentially from each other by bands wherein there are no through-apertures, and the manifold is dimensioned to register with one only of the said bands at any one time. A disadvantage which stems from this arrangement is that, as the filter drum is rotated for back flushing different through-apertured bands, a relatively large pressure fluctuation develops in the material being filtered and correspondingly in the clean filtered material. In the device according to FIGS. 1 and 2 of German Patent Application No. 2 407 663, the manifold member comprises a linear array of spaced-apart small flow passageways each of a small cross-sectional dimension corresponding to that of the apertures in the filter drum surface, so that each manifold passageway is capable only of back flushing a single small drum aperture at a time, and a valving member is further associated with the array of manifold passageways so that only a single such small passageway can be back-flushed at a time. Not only would such an arrangement be totally incapable of satisfactorily back-flushing the filter drum in the presence of any significant degree of particulate contamination of the material to be filtered on account of the small size of the apertures and passageways, but also the array of small manifold passageways is strongly susceptible to clogging, particularly since each would experience only intermittent through flow. Plastic material clogging the apertures would degrade with time in the high temperature environment of an extruder, and in the arrangement of German Patent Application No. 2 407 663 could eventually find its way into the filtered material stream, with potentially serious and disadvantageous results. Moreover, the inlet passageway to the filter in the German application is divided into a number of distribution ducts separated by projections which cover a proportion of the filter drum surface aperture. This gives rise to dead spaces where no flow occurs, with resultant high risk of clogging and degradation of the material being filtered. To applicant's knowledge, the device described in the German application has not been manufactured.

The object of the present invention is to provide a filtering device which can be made fully automatic in operation, which does not suffer from the disadvantages associated with prior art proposals, and which furthermore is capable of successfully filtering heavily contaminated materials such as recovered plastic materials, and with relatively small outlet pressure fluctuations.

The present invention provides a screening device for removing foreign matter from a flowable material, comprising a filter drum arranged to receive material to be filtered at its outer surface and to deliver filtered material from its interior, the material having been filtered by passage through the wall of the drum from the exterior to the interior thereof, and means for cleansing the external surface of the filter drum by selective back flow of filtered material from the interior to the exterior of the drum so as to flush away deposited foreign matter. The cleansing means comprising a manifold member in seating engagement with a limited area of the external surface of the drum to provide for a flow of filtered material from the drum interior through said limited area of the drum external surface and into the said manifold member, and means for rotating said drum so as to cause different areas of the external surface thereof to register successively with said manifold member and to be cleansed by said back flow of filtered material. The filter drum comprises an inner and an outer cylindrical filter barrel adapted to receive therebetween a cylindrical filter screen, said outer barrel having a plurality of relatively large spaced apart openings in its outer surface each of which communicates via a passageway through the thickness of the barrel wall with a correspondingly large opening in the inner surface of the barrel, said inner barrel having through apertures of such small size that a plurality thereof register with each of said openings in the inner surface of the outer barrel, and said manifold member being dimensioned to seat with an area of the external surface of the outer filter barrel corresponding to one of the said openings therein.

The invention thus concerns a filtering device of the back-flushing type, wherein the filter drum comprises an inner and an outer cylindrical filter barrel adapted to receive therebetween a cylindrical filter screen e.g. of wire gauze material or porous sintered metal. The outer barrel has a plurality of relatively large, spaced-apart openings in its outer surface, and each of these communicates via a divergent passageway through the thickness of the barrel wall with a very much larger opening in the inner surface; in an exemplary embodiment, the passageways are conical. The inner barrel has apertures in its surface of such a small size that a plurality thereof will register with each of the relatively large openings in the inner surface of the outer barrel when the inner and outer barrels are assembled in operative relationship. The openings in the outer surface of the outer barrel are preferably arranged in a plurality of circumferential rows and the manifold means correspondingly preferably comprises a plurality of correspondingly sized manifold channels, the outer barrel openings in different rows advantageously being axially offset with relation to each other so that, as the filter drum is rotated only one manifold channel at a time is operative.

By virtue of having single discrete openings in the outer filter barrel of a relatively large size, as compared for example with the openings of the filter drum disclosed in applicants British Pat. No. 1 605 585 or in German Patent Application No. 2 407 663, and furthermore having the said openings leading into substantially larger voids within the thickness of the outer filter barrel, it becomes possible to work with more contaminated materials than heretofore, since clogging of the outer filter barrel with impurities is reduced. The openings in the outer surface of the filter barrel serve to determine the size of contamination particle that can be filtered out by the device and subsequently flushed away in the back flushing operation, and it will be appreciated from the following descriptions of a preferred embodiment that these openings are larger by several orders of magnitude than the corresponding openings of prior art devices. The filter device according to the present invention thus is able to work with degrees of contamination of the material being filtered which, in the prior art devices mentioned, would rapidly have resulted in the device becoming clogged and inoperative.

Even with the relatively large openings in the outer barrel of the filter drum, it has been found that, so long as these are back flushed one at a time, the resultant pressure variations in the output of the device can be as low as about ±3%. With small pressure variations of this order, the device becomes usable with extruders producing fine filaments or fine films. It has not previously been possible to reliably use screen changer type filtering devices on extrusion lines designed with such products in mind.

The means for rotating the filter drum preferably comprises a toothed wheel secured to or formed integrally with the filter drum or a component part thereof and pawl means arranged to be reciprocably driven by a prime mover for indexing the toothed wheel by engagement of said pawl means in successive operations of the prime mover with successive teeth of the toothed wheel. A pressure sensor in the inlet passage to the filter drum is preferably arranged to output a control signal when the inlet pressure exceeds a predetermined level indicative of a predetermined degree of contamination of the filter element, and the filter drum can then be arranged to respond to said control signal, (a) either to rotate the filter drum into a screen flushing position where the drum dwells for a timed period while flushing proceeds and then the drum rotates to the next flushing station with this operation repeated until the inlet pressure has fallen to within the normal operational range, or (b) to cause the filter drum to rotate through a predetermined number of flushing stations in each case, with a predetermined dwell period at the respective station regardless of the inlet pressure falling to its normal operational range at an intermediate stage.

In a form which has been found to be advantageous having regard to the magnitudes of the forces to be overcome in order to achieve rotation of the filter drum, the pawl means comprises a generally T-shaped member having a head portion and a body portion extending transversely to said head portion, said prime mover being coupled to the end of said body portion remote from the head portion, the head portion having at one end thereof a tooth engageable with the toothed wheel and a cam follower member affixed thereto at a spacing from said tooth and riding on a cam track, the arrangement being such that a forward movement of said prime mover applied to the end of the body portion of the pawl means initially generates a turning movement about said cam follower member so as to move the tooth on the head portion of the pawl means into engagement with the toothed wheel, and then causes the pawl means to move bodily so as to index the toothed wheel, and a return movement of the prime mover initially generates an opposite turning movement so as to release the tooth on the head portion of the pawl from the toothed wheel, and then restores the pawl means bodily to its initial position. For powering such an arrangement it is considered most convenient to employ a hydraulic cylinder as the prime mover.

The invention, together with features and advantages thereof, will best be appreciated from consideration of the following detailed description of an exemplary embodiment which is illustrated in the accompanying drawings, wherein.

Figure 1:
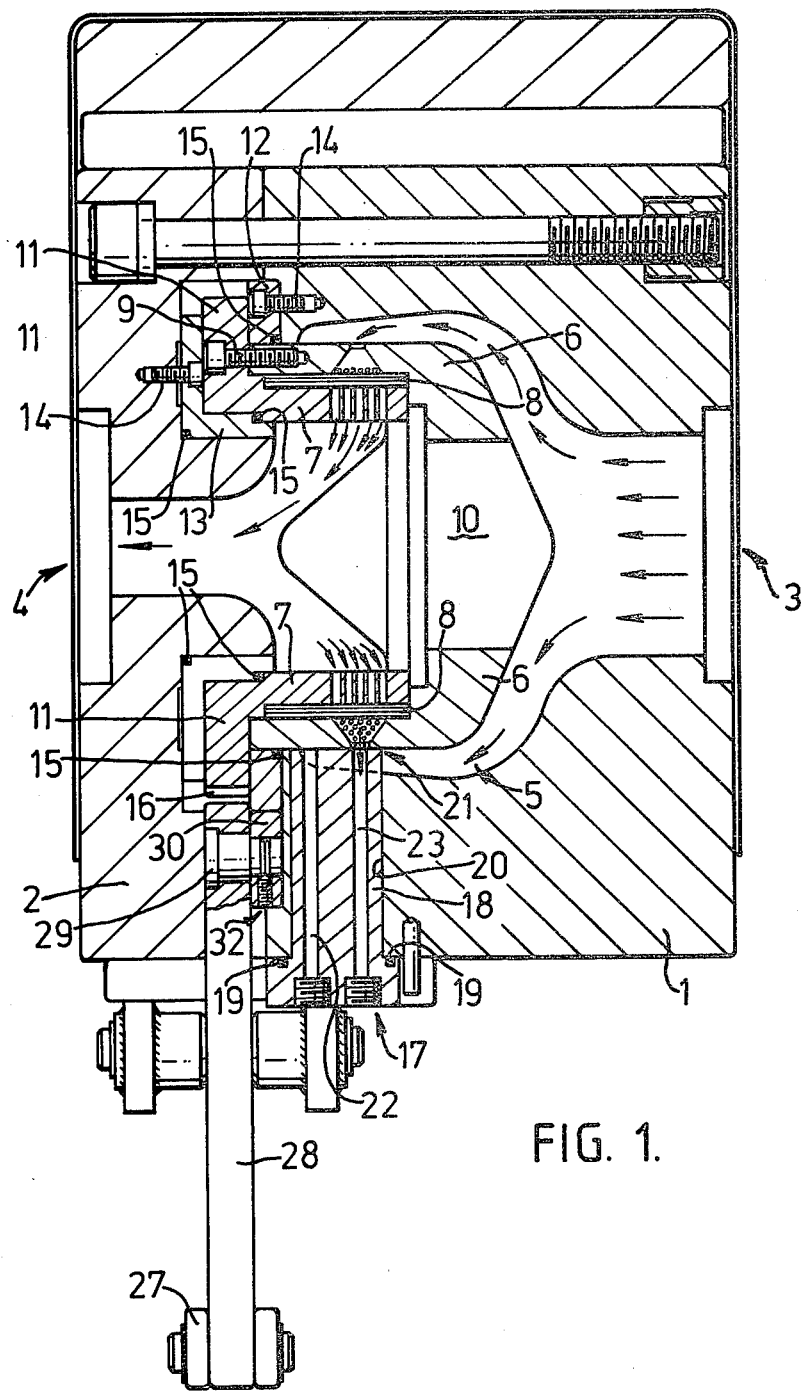
FIG. 1 is a generally cross-sectional view of an embodiment of the invention taken on a plane traversing the fluid flow axis through the device.
Figure 2:
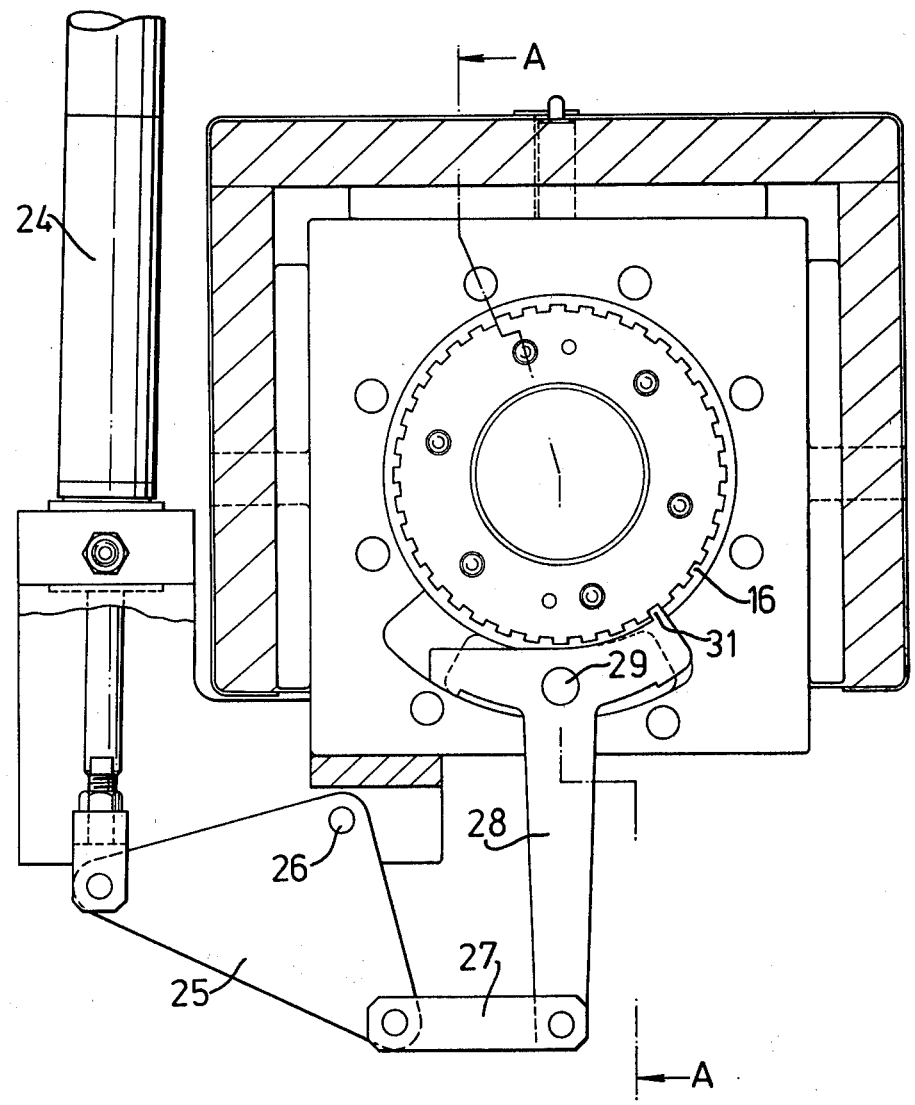
FIG. 2 is a side view from the left-hand side as viewed in FIG. 1 and with an end cap removed to show internal components.
Figure 6:
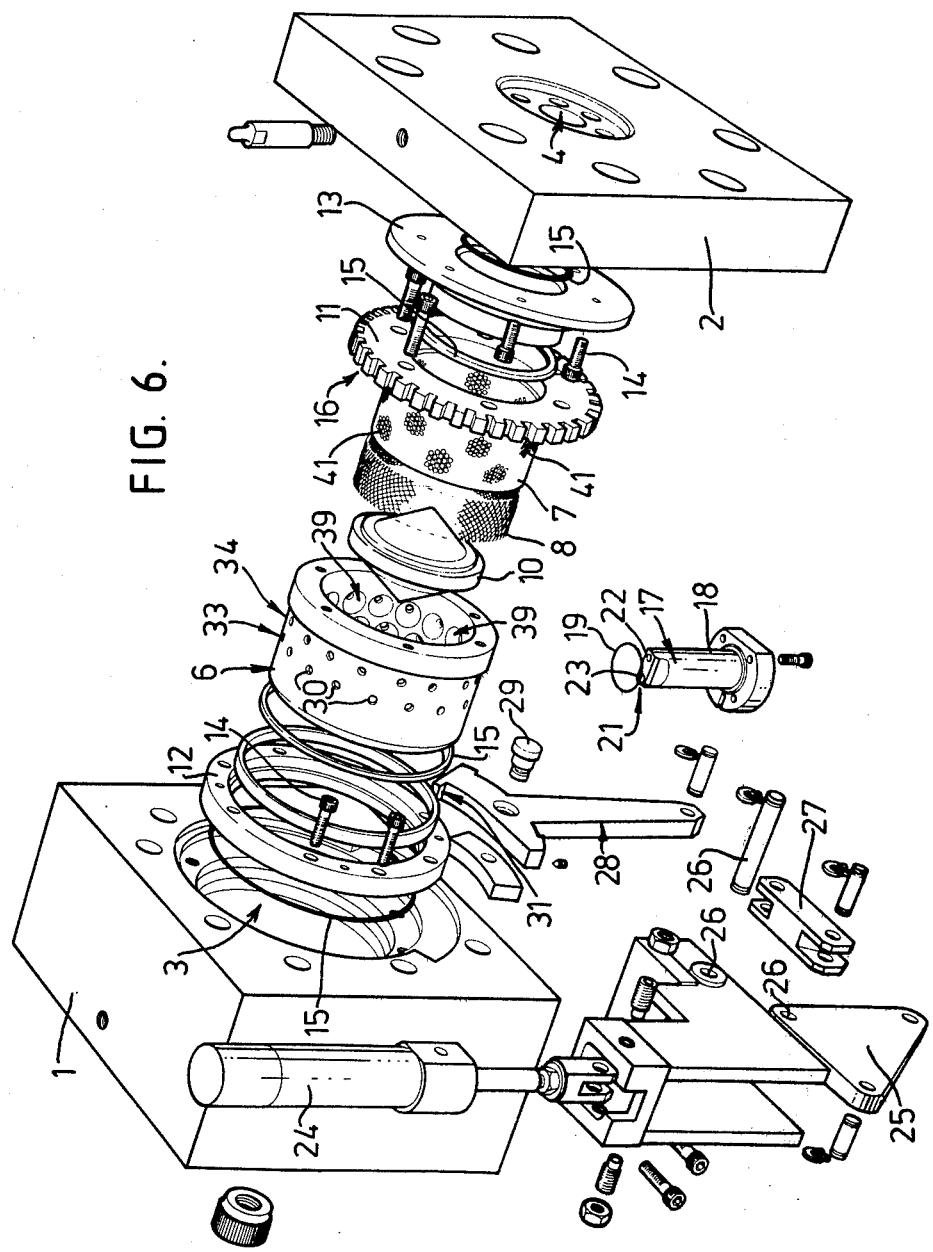
FIG. 6 shows an exploded view of the embodiment.

Referring first to FIGS. 1 and 2 and also to the exploded view of FIG. 6, the filtering device as shown therein comprises a body portion 1 and an end cap 2 adapted to be bolted securely to the body portion 1, an inlet passage 3 being formed in the body portion 1 and an outlet passage 4 being formed in the end cap 2. The two passages 3 and 4 define an enlarged chamber 5 within the heart of the device, and within this chamber are provided a filter drum assembly comprising an outer barrel 6, an inner barrel 7, and captured between the inner and outer barrels a cylindrical filter element 8, e.g., of woven wire gauze or porous sintered metal. The outer and inner barrels 6 and 7 are securely bolted together by means of bolts 9 and, as shown, they capture between them a shaped body 10 which on the inlet side diverts incoming material to be filtered around the outside of the outer barrel 6, and on the outlet side assures that there is no "dead space" within the chamber 5 where filtered material might tend to be trapped.

The filter drum assembly is rotatable within the chamber 5 by virtue of a flange 11 on the inner barrel 7 being journalled between plain bearing surfaces 12 and 13 bolted respectively to the body portion 1 and to the end cap 2 by means of bolts 14. Sealing rings 15 are provided as shown to prevent substantial leakage through the bearing surfaces. Gear teeth 16, shown most clearly in FIG. 2, are provided around the rim of flange 11 for enabling the filter drum assembly to be rotated by a mechanism to be described hereinafter.

The particular form and construction of the outer and inner barrels 6 and 7, respectively, is shown more particularly in FIGS. 3A, 3B and 4A, 4B and will be described hereinafter. Shown in FIG. 1 is the construction of the manifold means 17 as comprising an insert 18 sealed by means of an "0" ring seal 19 into an accommodating recess 20 in the body portion 1 and having an inner end surface 21 configured to register with and seal against the outer surface of outer barrel 6 and a pair of through-passageways 22 and 23 for the flow of material back flushed from the filter drum assembly.

Referring now more particularly to FIG. 2, the filter drum assembly 6, 7, 8 is driven for rotation by means of an hydraulic cylinder 24 acting through a mechanical linkage system comprising plate 25 mounted to pivot about axis 26, link 27, and generally T-shaped pawl lever 28 mounted to pivot about axis 29 which is journalled to a bearing wheel 30 (FIG. 1) and having a head portion with a tooth 31 which engages successively with successive teeth 16 of inner barrel flange 11 in successive operations of the cylinder 24, the bearing wheel 30 running in a short channel 32 (FIG. 1) defined in body portion 1 and shaped to give the requisite movement to pawl tooth 31. The movement may readily be automated, for example by providing a pressure sensor in the inlet passageway 3 of the device and arranging for the hydraulic cylinder 24 to be actuated to index the filter drum assembly intermittently, with a dwell period of predetermined extent between successive indexations, until such a time as an overpressure sensed by the pressure sensor, and responsible for the actuation of the hydraulic cylinder 24, is reduced to a predetermined normal operational pressure.

To avoid the risk of damage to the filter drum assembly drive mechanism in the event that the filter is being used with a plastic material which is fluid only above a predetermined temperature, a thermocouple may be provided in the device to provide a control output to an interlock circuit for disabling the hydraulic actuator from being actuated until such a time as the device temperature is at least at a predetermined level.

Figure 3A:
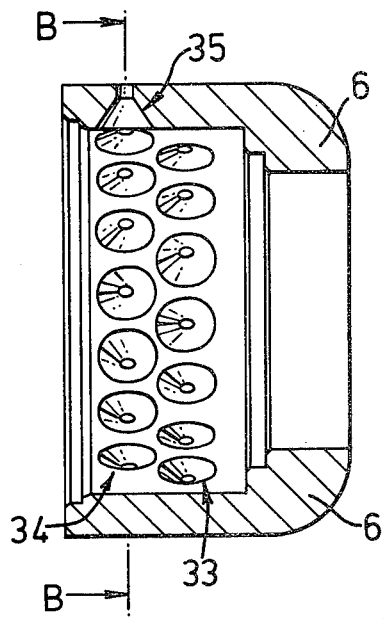
FIGS. 3A and 3B show the outer barrel in axial cross-sectional and circumferential cross-sectional views respectively.
Figure 3B:
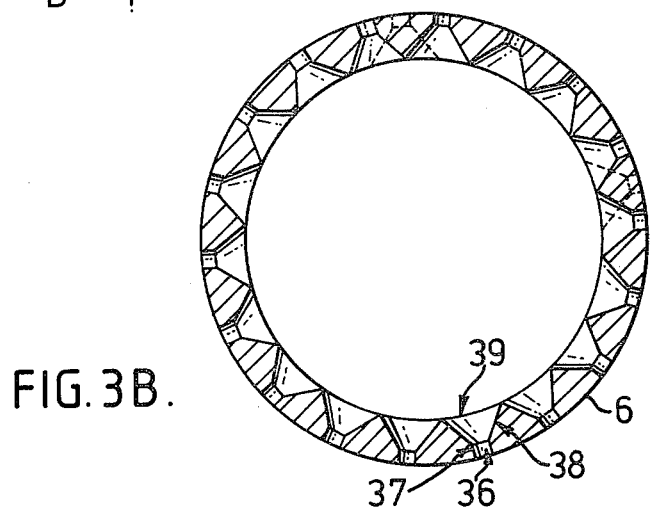

Referring now to FIGS. 3A and 3B, the outer barrel 6 of the filter drum assembly is shown therein, FIG. 3B being a sectional view on the line B-B of FIG. 3A. As shown the outer barrel 6 has two circumferential rows 33, 34 each of eighteen through passageways 35 with the passageways of different rows offset with respect to one another. Each passageway, as shown, comprises an opening 36 on the outer cylindrical surface of the barrel leading via a short bore 37 into a conically diverging portion 38 terminating at a relatively large opening 39 on the inner cylindrical surface of the barrel.

Figure 4A:
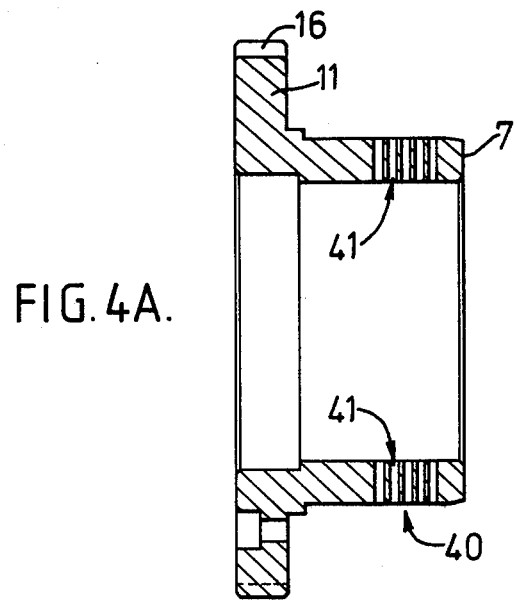
FIGS. 4A and 4B show corresponding cross-sectional views of the inner barrel.
Figure 4B:
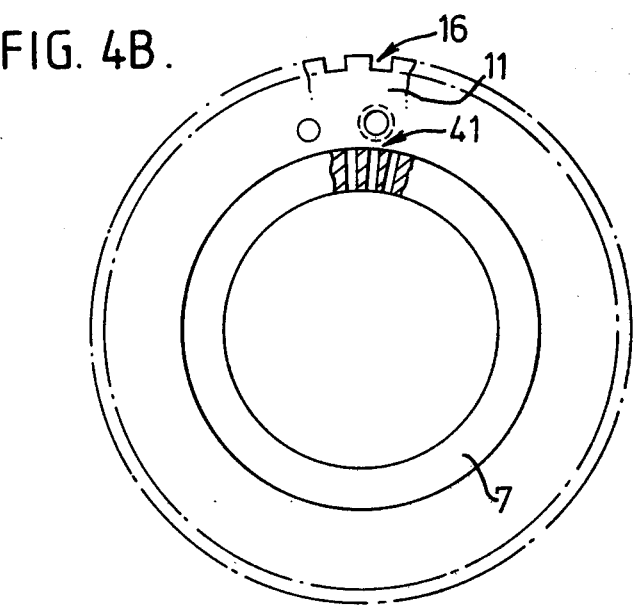

FIGS. 4A and 4B show the inner barrel 7 of the filter drum assembly. Two circumferential rows (only one of which, designated 40, can be seen) of discrete groups 41 of through holes are provided in locations such as to register with the openings 39 on the inner surface of the outer barrel 6 when the two barrels 6 and 7 are secured together in proper relationship. Each group of holes, there being eighteen groups in each row, comprises a hexagonal array of nineteen holes.

Figure 5:
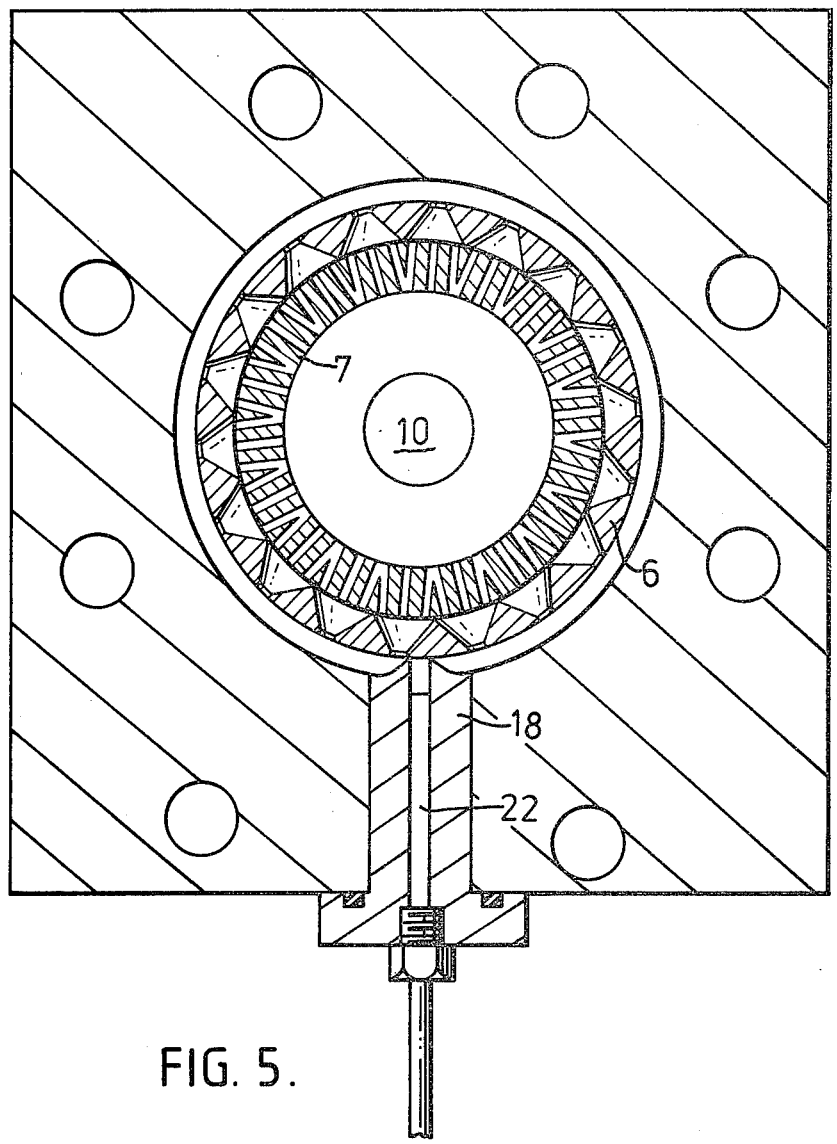
FIG. 5 is a cross-sectional view showing how the inner and outer barrels cooperate with each other and with the manifold means.

FIG. 5 shows how the outer and inner barrels 6 and 7 relate to each other and to the manifold means. This figure is considered to be self-explanatory, being a scrap section on "station Y" in FIG. 1.

The operation of the device thus described will be clear to those of appropriate skills from the foregoing description. Contaminated material flowing into inlet passageway 3 of body portion 1 (FIG. 1) will be diverted around the edges of outer barrel 6 and will enter the openings therein. Particulate contaminations will become entrained in the filter medium 8, and more particularly will deposit upon the outer surface thereof, while filtered material permeating through filter 8 will pass through the holes in the inner barrel 7 and flow into the outlet 4. As the filter drum assembly 6, 7, 8 is rotated, the holes in the external surface of the outer barrel 6 will register, one at a time, with respective ones of the channels 22 and 23 of the manifold means 18 so that particulate contaminants deposited on the filter medium 8 will be back flushed into the channels 22, 23 by flow of clean filtered material from the outlet passageway 4.

The holes in the outer surface of outer barrel 6 are so sized that even relatively large particles can enter and be deposited upon the filter 8, to be eventually back-flushed therefrom. A heating element and insulation are provided as shown in FIG. 1 and, as mentioned, means may be provided for monitoring the operating temperature of the device and thereby controlling the heater and/or the filter drum assembly rotation.

I claim:

1. A screening device for removing foreign matter from fluid plastic material, comprising elements designed, arranged and dimensioned to minimize pressure fluctuations during treatment of plastic polymers at up to the highest pressures and temperatures at which such polymers can be treated, including,
    (a) a filter drum arranged to receive material to be filtered at its outer surface and to deliver filtered material from its interior, said material having been filtered by passage through the wall of said drum from the exterior to the interior thereof;
    (b) means for cleansing the external surface of said filter drum by selective back flow of filtered material from the interior to the exterior of said drum so as to flush away deposited foreign matter, said cleansing means comprising a manifold member in seating engagement with a limited area of the external surface of said drum to provide for a flow of filtered material from the drum interior through said limited area of the drum external surface and into said manifold member, and means for rotating said drum so as to cause different areas of the external surface thereof to register successively with said manifold member and to be cleansed by said back flow of filtered material;

(c) said filter drum comprising an inner and an outer cylindrical filter barrel adapted to receive therebetween a cylindrical filter screen, said outer barrel having a plurality of relatively large spaced apart openings in its outer surface each of which communicates via a passageway through the thickness of the barrel wall with a correspondingly large opening in the inner surface of said barrel, said inner barrel having through apertures of such small size that a plurality thereof register with each of said openings in the inner surface of said outer barrel, and said manifold member being dimensioned to seat with an area of the external surface of said outer filter barrel corresponding to one of the said openings therein.

2. A screening device as claimed in claim 1, wherein the passageways communicating the openings in the outer surface of said outer filter barrel with the openings in the inner surface thereof are divergent from the outside to the inside, whereby the openings in the inner surface are larger than those in the outer surface.

3. A screening device as claimed in claim 1 or 2, wherein the openings in the outer surface of said outer filter barrel are arranged in a plurality of circumferential rows and the manifold means comprises a manifold channel cooperating with each of said rows.

4. A screening device as claimed in claim 3, wherein the outer filter barrel openings in different rows are axially offset relative to each other so that, as the filter drum is rotated only one manifold channel at a time is operative.

5. A screening device as claimed in claim 1 or 2 wherein the openings in the outer and inner surfaces of said outer filter barrel are circular and said passageways are frusto-conical, and said through openings in the inner filter barrel are arranged in discrete groups each registering with one of the openings in the inner surface of said outer barrel.

6. A screening device as claimed in claim 5, wherein each of said discrete groups of through openings comprises a hexagonal array of nineteen openings.

7. A screening device as claimed in claim 1, or 2 wherein said filter screen comprises porous sintered metal.

8. A screening device as claimed in claim 1 or 2 wherein said means for rotating said filter drum comprises a toothed wheel and pawl means reciprocably driven by a prime mover for indexing said toothed wheel by engagement of said pawl means in successive operations of said prime mover with successive teeth of said toothed wheel.

9. A screening device as claimed in claim 8, wherein said pawl means comprises a generally T-shaped member having a head portion and a body portion extending transversely to said head portion, said prime mover being coupled to the end of said body portion remote from said head portion, said head portion having at one end thereof a tooth engageable with said toothed wheel and a cam follower member affixed thereto at a spacing from said tooth and riding on a cam track, the arrangement being such that a forward movement of said prime mover applied to the end of said body portion of said pawl means initially generates a turning movement about said cam follower member so as to move said tooth on said head portion of said pawl means into engagement with said toothed wheel and then causes said pawl means to move bodily so as to index said toothed wheel, and a return movement of said prime mover initially generates an opposite turning movement so as to release said tooth on said head portion of said pawl from said toothed wheel and then restores said pawl means bodily to its initial position.

10. A screening device as claimed in claim 8 wherein said prime mover is a hydraulic cylinder.

11. A screening device as claimed in claim 1 or 2, wherein said filter drum is mounted in a housing having defined therein an inlet passage, an outlet passage, and a chamber communicating with said inlet and outlet passages, said filter drum being mounted in said chamber in cantilever fashion by one axial end thereof such that the total outer cylindrical surface of said filter drum other than the portion thereof in registry with said manifold member is accessible to material flowing into said inlet passage, said outlet passage communicating with the interior of said filter drum.

12. A screening device as claimed in claim 11, wherein a shaped body is provided within said filter drum for directing the flow of filtered material passing through said drum from the exterior to the interior thereof towards said outlet passage and avoiding stagnant flow areas in said outlet passage.

* * * * *